July 19, 1960
M. DREYFUS
2,945,999
GENERATOR ELECTRONIC REGULATING DEVICE
WITH DUAL REFERENCE VOLTAGE
Filed Nov. 4, 1957
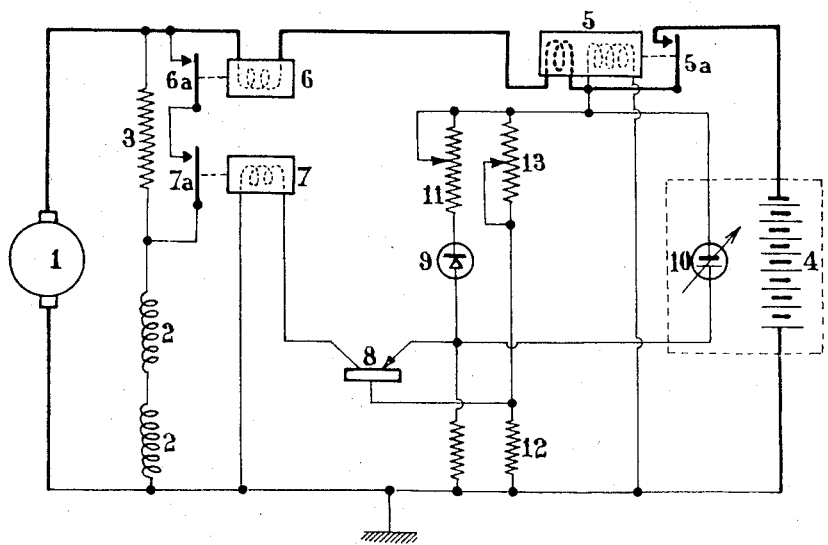

United States Patent Office 2,945,999
Patented July 19, 1960

2,945,999
GENERATOR ELECTRONIC REGULATING DEVICE WITH DUAL REFERENCE VOLTAGE

Marcel Dreyfus, Rueil-Malmaison, France, assignor to Societe Anonyme dite: Etablissements Ducellier, Paris, France Filed Nov. 4, 1957, Ser. No. 694,205

Claims priority, application France Nov. 6, 1956

3 Claims. (Cl. 320—35)

In installations of a type already known which are used for charging accumulator batteries with a dynamo, the regulating circuit includes a voltage controller of traditional design, an element to produce a reference voltage which is chosen according to the voltage to be controlled and finally a transistor acting in such a way that the controller comes into operation only if there is a certain difference between the reference voltage and the voltage to be controlled. In such installations it is sometimes required that the tension should not overstep a certain maximum in order to prevent certain elements of the circuit from deterioration.

The present invention concerns the correct charging conditions of the battery in relation to the variations in the temperature, as far as allowed by the maximum value which has been set for the voltage. To this effect the electronic dual reference voltage regulating device, according to the invention, which may be applied in particular to charging a battery by a dynamo installation including a current controller, mounted in series on the charging circuit, and a voltage controller, the operation of which is determined by a transistor, is characterized by two reference voltage cells placed in parallel on the circuit of the emitter of the transistor, namely, a first cell for a fixed reference voltage, independent of temperature, and a second cell for a voltage which varies in relation to the temperature.

When the device is applied to charging a battery, the cell producing a variable reference voltage is permanently kept at a temperature equal to the temperature of the battery. A practical example will be described hereunder with reference to the annexed drawing, it being understood that the description of this practical example does not imply any limitation of the scope of the invention as defined in the claims following the description.

A dynamo 1 is connected in such a way as to charge the battery 4, the excitation current of dynamo 1, which flows in windings 2, being limited by resistance 3.

The switch 5 operating both as circuit breaker and circuit closer and the operating contacts 5a of said switch are placed, according to known methods, on the circuit going from the dynamo to the battery. Conversely a current controller 6 is placed in series between the dynamo and switch 5, a voltage controller 7 being connected between the collecting electrode of a transistor 8 and the earth. The contacts 6a and 7a of controllers 6 and 7 which are normally open are connected in series, said contacts constituting together a shunting circuit or resistance 3. The emitter of transistor 8 is connected in parallel with two reference voltage cells. Cell 9 produces a reference voltage of constant value which is independent of the temperature; it is connected to the main charging circuit by a variable resistor 11. Cell 10 produces a reference voltage which varies in regard to the temperature of battery 4. This last fact is symbolized on the drawing by a rectangular dotted line enclosing both the battery 4 and reference voltage cell 10. Cell 10 is connected directly between the main charging circuit, leading from the dynamo to the battery, and the emitter of transistor 8. The base electrode of said transistor is maintained at a potential which is proportional to the voltage given by the dynamo, this result being obtained by connecting said base electrode to the intermediary point of a voltage divider constituted by resistance 12 and variable resistor 13.

With reference to this drawing it can be seen that the actual voltage obtained is always controlled by the one of the two reference voltages which has the lowest value. If for any given temperature of battery 4 the reference voltage given by cell 10 is lower than the reference voltage given by the fixed cell 9, the battery 4 is charged correctly to a voltage which corresponds to the actual temperature.

As long as the voltage given by the dynamo is lower than the regulating voltage, the potential of the base electrode on transistor 8, which is proportional to the voltage given by the dynamo, is necessarily lower than the reference voltage applied to the emitter of the transistor. Consequently, transistor 8 is conductive (it being understood that said transistor is of the type PNP in the considered example of execution) and controller 7 is energized. Contact 7a is then closed and, as contact 6a is closed too, resistance 3 is short-circuited.

If the voltage of the dynamo is higher than the regulating voltage, the potential of the base electrode of transistor 8 becomes higher than the potential of the emitter, this last potential corresponding actually to the reference voltage given by cell 10. Consequently transistor 8 is no longer conductive. As the controller 7 is no longer energized, contact 7a opens and resistance 3 is connected in series with the excitation windings 2, which results in a reduction of the voltage produced by the dynamo.

If, following a reduction in temperature of battery 4, the reference voltage given by cell 10 becomes higher than the reference voltage given by cell 9, the voltage produced by the dynamo is then controlled by cell 9. It is then obvious that this reference voltage cell 9 fixes a maximum voltage which can never be overstepped.

What I claim is:

1. Electronic regulating device for the maximum voltage applied by a dynamo to a battery so as to vary the voltage in relation to the temperature of said battery, comprising means for varying the voltage of the dynamo, a transistor with first and second input circuits and one output circuit, a connection between said output circuit and the means for modifying the voltage of the dynamo, so as to control said means in regard to the state of the transistor, a first cell applying a reference voltage of fixed value to the first input circuit of the transistor, a second cell applying a reference voltage, which varies in regard to the temperature of the battery, to the first input circuit of the transistor, this variable reference voltage being lower than the fixed reference voltage when the temperature of the battery is higher than a predetermined value, and means to apply to the second input circuit of the transistor a potential which is proportional to the voltage of the dynamo, in such a way that the state of the transistor is determined by the voltage applied to the first and second input circuits respectively, whereby when the temperature of the battery is higher than a predetermined value, the cell giving the variable reference voltage determines the maximum voltage of the dynamo, and that, when the temperature becomes lower than this predetermined value, the cell giving the fixed reference voltage determines the maximum value which the voltage of the dynamo can reach, whatever the value of the temperature of the battery.

2. Electronic regulating device according to claim 1, which comprises a transistor of the PNP type, the latter having an emitter, a base electrode and a collector, a connection linking the emitter to both the fixed voltage cell and to the variable voltage cell, a voltage divider connected to the terminals of the dynamo, a connection between the said voltage divider and the base electrode, a connection between the collector and the means of varying the voltage of the dynamo, so that, if the voltage which is proportional to the voltage of the dynamo and is applied to the base electrode is lower than the voltage of the emitter, the transistor is conductive and the means of varying the voltage of the dynamo are controlled in a way tending to increase this voltage, and that, if the voltage applied to the base electrode becomes higher than that of the emitter, the transistor is no longer conductive and the means for varying the voltage are controlled in a way tending to decrease this voltage.

3. Electronic regulating device according to claim 2, where the means for varying the voltage of the dynamo include an excitation winding, a resistor which is connected in series with said winding, a relay switch the contact of which is normally open and by-passes said resistor and a link between said relay switch and the output circuit of the transistor, in such a manner that, when the transistor is conductive, the relay switch is energized, the contact closed and the resistor short-circuited, and that when the transistor is no more conductive, the relay switch is no more energized, the contact is open and the resistor is connected in series with the excitation winding.

References Cited in the file of this patent

UNITED STATES PATENTS

| | | |
|---|---|---|
| 1,948,372 | Fitzgerald | Feb. 20, 1934 |
| 2,118,644 | Garman | May 24, 1938 |
| 2,666,883 | Guelpa | Jan. 19, 1954 |
| 2,689,322 | Godshalk | Sept. 14, 1954 |
| 2,693,568 | Chase | Nov. 2, 1954 |
| 2,693,572 | Chase | Nov. 2, 1954 |

FOREIGN PATENTS

| | | |
|---|---|---|
| 474,398 | Great Britain | Nov. 1, 1937 |